(12) United States Patent
Tulett et al.

(10) Patent No.: US 8,514,655 B2
(45) Date of Patent: Aug. 20, 2013

(54) METHOD AND APPARATUS FOR MEASURING A HYDROPHONE PARAMETER

(75) Inventors: John Richard Tulett, Yokohama (JP); Colin A. Wilson, Surrey (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 447 days.

(21) Appl. No.: 12/912,745

(22) Filed: Oct. 27, 2010

(65) Prior Publication Data
US 2011/0110186 A1    May 12, 2011

Related U.S. Application Data

(60) Provisional application No. 61/260,841, filed on Nov. 12, 2009.

(51) Int. Cl.
*G01V 13/00*      (2006.01)
(52) U.S. Cl.
CPC ....................................... *G01V 13/00* (2013.01)
USPC ........................................................... 367/13
(58) Field of Classification Search
USPC ........................................................... 367/13
See application file for complete search history.

(56) References Cited

U.S. PATENT DOCUMENTS

| | | | |
|---|---|---|---|
| 3,659,255 A * | 4/1972 | Trott ................................ 367/13 |
| 5,285,995 A * | 2/1994 | Gonzalez et al. ............. 248/550 |
| 5,361,240 A | 11/1994 | Pearce |
| 5,367,497 A * | 11/1994 | Marschall ....................... 367/20 |
| 5,448,904 A * | 9/1995 | Zuckerwar et al. ............ 73/1.82 |
| 5,654,937 A * | 8/1997 | Striffler ........................... 367/13 |
| 5,712,828 A * | 1/1998 | Luscombe et al. .............. 367/13 |
| 6,122,225 A * | 9/2000 | Cheng et al. .................. 367/149 |
| 6,381,544 B1 * | 4/2002 | Sallas et al. ..................... 702/17 |
| 6,512,980 B1 * | 1/2003 | Barr .................................. 702/1 |
| 6,883,638 B1 * | 4/2005 | Maxwell et al. .............. 181/102 |
| 2003/0011480 A1 * | 1/2003 | Fehrenkamp .............. 340/573.6 |
| 2005/0257598 A1 * | 11/2005 | Alcoverro et al. ............. 73/1.57 |
| 2007/0258330 A1 * | 11/2007 | Berg et al. ..................... 367/149 |
| 2007/0297287 A1 * | 12/2007 | Robertsson et al. ............ 367/24 |
| 2008/0123467 A1 * | 5/2008 | Ronnekleiv et al. ............ 367/20 |
| 2008/0219096 A1 * | 9/2008 | Underhill et al. ............... 367/57 |
| 2008/0316860 A1 * | 12/2008 | Muyzert et al. ................. 367/25 |
| 2011/0080808 A1 * | 4/2011 | Muyzert et al. ................. 367/43 |

OTHER PUBLICATIONS

International Search Report from International Application No. PCT/IB2010/002752.*
Written Opinion of Interational Search Authority from International Application No. PCT/IB2010/002752.*

* cited by examiner

*Primary Examiner* — Isam Alsomiri
*Assistant Examiner* — James Hulka
(74) *Attorney, Agent, or Firm* — Jianguang Du; Jody DeStefanis (57) ABSTRACT

A technique is designed to measure parameters of hydrophones, such as measurement of hydrophone acceleration canceling properties. The technique involves testing a selected hydrophone under conditions representative of the actual conditions in which the hydrophone is to be operated. By using the representative conditions, the acceleration canceling properties of the hydrophone and/or other parameters of the hydrophone are more accurately determined.

20 Claims, 10 Drawing Sheets

METHOD AND APPARATUS FOR MEASURING A HYDROPHONE PARAMETER

CROSS-REFERENCE TO RELATED APPLICATION

The present document is based on and claims priority to U.S. Provisional Application Ser. No. 61/260,841, filed Nov. 12, 2009, the contents of which are incorporated for all purposes herein.

BACKGROUND OF THE DISCLOSURE

1. Field of the Invention

The present disclosure relates to techniques for measuring parameters of hydrophones, such as techniques for determining acceleration compensation of hydrophones. Although a general area of applicability is listed, other areas not expressly defined may also fall within the intended and implied scope of the present disclosure.

2. Background of the Related Art

The following descriptions and examples are not admitted to be prior art by virtue of their inclusion in this section.

Geologic structures are mapped by creating seismic waves from an artificial source and recording data from the seismic waves with receivers in a borehole. The data comprises arrival time and shape of the waves reflected from acoustic-impedance contrasts. For example, a check-shot survey uses the direct path from source to receiver to measure travel times, whereas a Vertical Seismic Profile (VSP) survey uses the reflected energy recorded at each receiver position, as well as the direct path from source to receiver. For example, in an offshore environment air-guns may be used as the source of acoustic energy. The air-gun source and a hydrophone(s) are deployed over the side of a rig and positioned a few meters below the sea surface. The air gun source typically generates a signal bandwidth from 5-250 Hz.

Hydrophones, as the name suggests, are used to record/measure energy or pressure waves propagating through the sea. As such, hydrophones are used in many applications, including use in proximity to an air-gun to measure the energy of an acoustic source. The acoustic source may be towed in an array behind a boat or positioned in proximity to a marine borehole. However, in each of these environments, a certain amount of noise exists which is caused by various phenomena. Noise affects the quality of the measurements in a negative way. One such example is noise due to the external acceleration forces acting on hydrophones. This acceleration may be due to movement of water past the hydrophone as it is pulled in a streamer behind a vessel, movement of water past the hydrophone suspended beneath a buoy, movement of fluid past the hydrophone in a wellbore, or due to various other movements which create acceleration forces. Noise due to acceleration may be dealt with by using an acceleration canceling hydrophone employing various techniques, including passive and active compensation to accomplish the "acceleration canceling".

To test the "acceleration canceling" quality and performance of hydrophones, the industry has adopted several testing methods. One testing method involves lowering the hydrophone into a deep pool to provide the necessary hydrostatic pressure to replicate actual use in the sea. The replication is necessary because the physical construction of the hydrophone is affected by hydrostatic pressure that, in-turn, affects the performance of the hydrophone and its acceleration canceling feature. Once located in the deep pool, the hydrophone is shaken to replicate the noise while measurements are taken to determine hydrophone performance. The measurements are obtained and compared with measurements from a reference hydrophone or sensor to achieve a control measurement. However, this type of approach to testing is very costly (infrastructure), dangerous, and difficult to implement.

Another testing method involves testing the hydrophone in the air without any hydrostatic pressure being applied. This typically is referred to as the "Shaker" method and includes mounting a hydrophone to a shaker table/mechanism or speaker and measuring the hydrophones response to movement. Although such technique is well known and is able to utilize standard lab equipment, the approach also has many disadvantages. For example, tests conducted in atmospheric conditions do not test the hydrophone in representative working conditions. Therefore, such testing cannot be representative of the working performance of the hydrophone. For example, such testing cannot provide an accurate indication of hydrophone acceleration canceling properties in a fluid medium or marine environment.

SUMMARY

Embodiments of the present disclosure generally relate to a method and system for measuring parameters of hydrophones, such as measurement of hydrophone acceleration canceling properties. The technique involves testing a selected hydrophone under conditions representative of the actual conditions in which the hydrophone is to be operated. By using the representative conditions, the acceleration canceling properties of the hydrophone and/or other parameters of the hydrophone are more accurately determined. In one embodiment, a fluid filled pressure vessel is used to enclose the hydrophone while mounted to a vibratory source to more accurately determine the acceleration canceling properties of the hydrophone.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Illustrative embodiments and aspects of the present disclosure are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
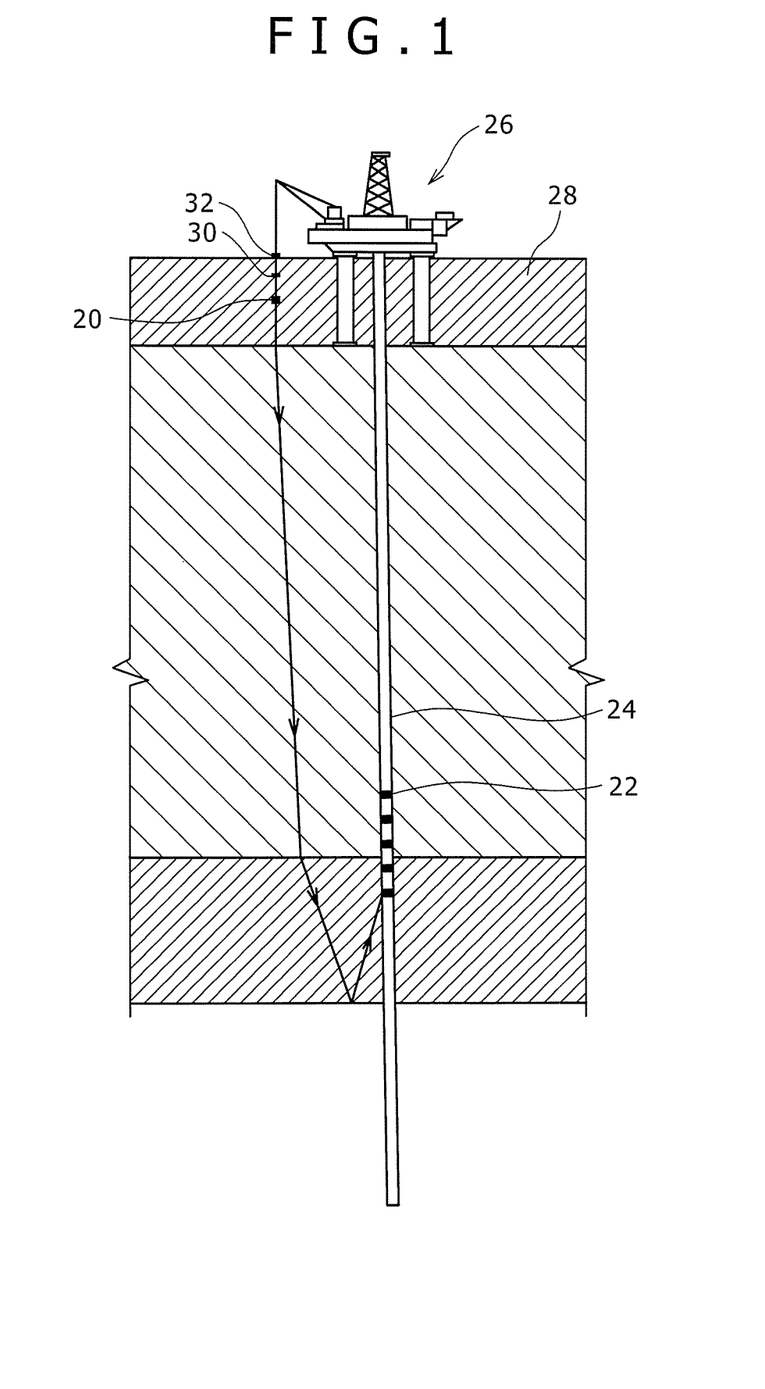
FIG. 1 illustrates an example of a survey system utilizing a hydrophone which has been tested for acceleration compensation, according to an embodiment of the present invention.

FIG. 1 illustrates an example of how a hydrophone 20 may be employed after measuring the acceleration compensation or other parameters of the hydrophone. In this example, a seismic survey is performed with the aid of receivers 22 positioned along a borehole 24 beneath a rig 26. The rig 26 is located in a sea region 28 and suspends a seismic source 30 via, for example, a buoy 32. Geologic structures may be mapped by creating seismic waves from the seismic source 30. By way of example, seismic source 30 may comprise one or more air-guns. The seismic source 30 and hydrophone 20 are deployed below the surface of sea 28. For example, buoy 32 may be used to maintain the seismic source 30 at a desired, constant depth (e.g. 3-5 m) beneath the surface. Similarly, the buoy 32 maintains the hydrophone 20 at a desired, constant depth (e.g. 3-5 m) beneath the seismic source 30.

However, one or more hydrophones 20 may be subjected to acceleration compensation measurement prior to use in a variety of seismic survey applications, including use with seismic arrays towed through sea region 28 via a suitable tow vessel. Regardless of the specific type of seismic survey and the specific use of hydrophone 20, the system and methodology described herein facilitate measurement of a desired parameter, e.g. acceleration compensation, of the hydrophone 20. Knowledge of the acceleration compensation enables accumulation of more accurate data from the hydrophone 20.

Figure 2:
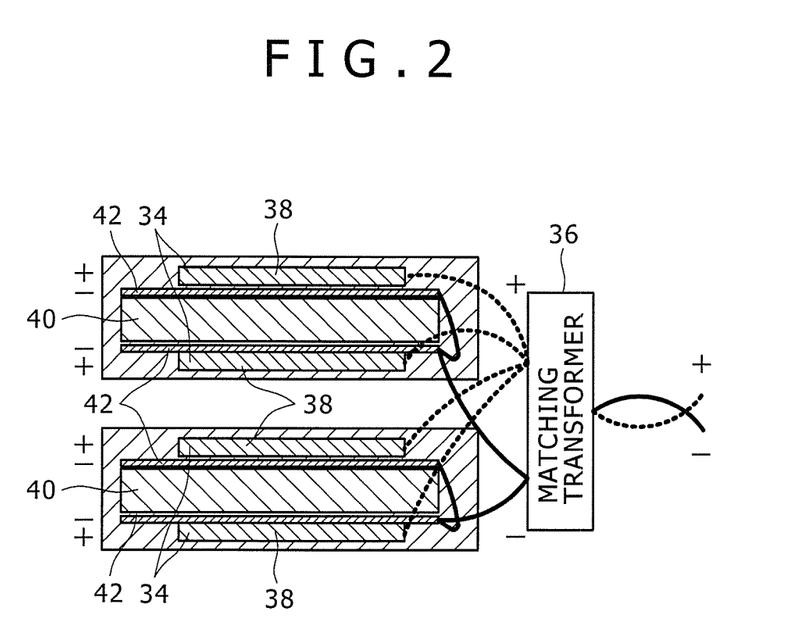
FIG. 2 illustrates an example of a type of hydrophone measured for acceleration compensation, according to embodiment of the present invention.

Referring generally to FIG. 2, an example of hydrophone 20 is illustrated as comprising pressure sensitive piezo-electric elements 34 coupled with a matching transformer 36 that operates to match the frequency response of the hydrophone. The transformer 36 also may function to lower output impedance for matching an input recording device when the hydrophone 20 is connected through long cables. In this specific example, the hydrophone 20 employs single-sided ceramic discs 38 with a spacer 40 between each pair of ceramic discs 38. The ceramic discs 38 may be mounted on opposite sides of the spacer 40 via mounting discs 42, such as copper mounting discs. The positive sides of the ceramic discs 38 point in opposite directions on the outer surfaces of the assembly. In this embodiment, both positive sides are wired in parallel to connect to one side of the matching transformer 36. Both negative sides are wired in parallel to connect to the other side of the matching transformer 36, as illustrated.

Figure 3:
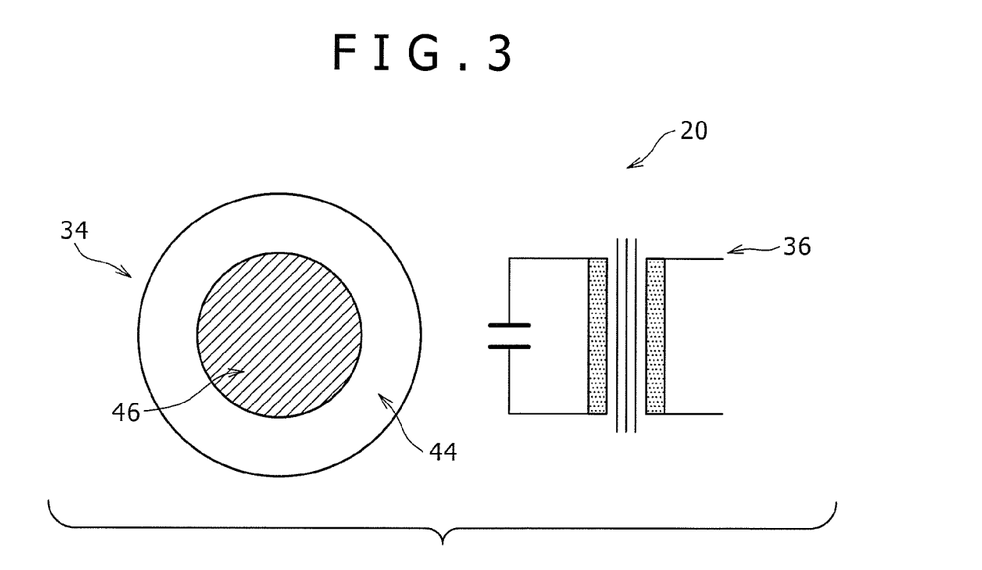
FIG. 3 illustrates another example of a type of hydrophone measured for acceleration compensation, according to embodiment of the present invention.
Figure 4:
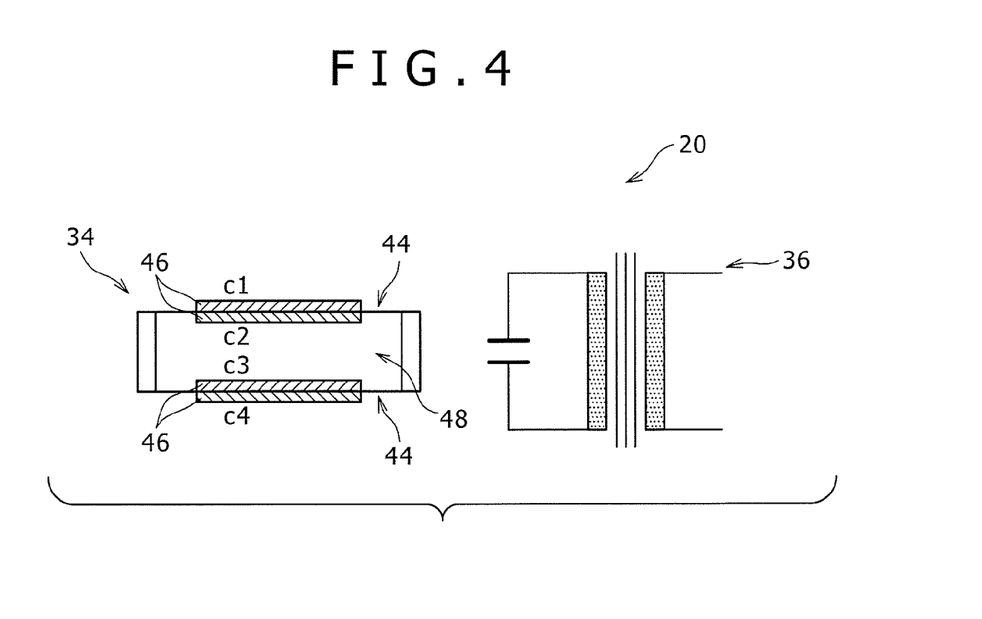
FIG. 4 illustrates a side view of the hydrophone illustrated in FIG. 3, according to an embodiment of the present invention.

A more generalized hydrophone 20 is schematically illustrated in FIGS. 3 and 4. In this embodiment, piezo-electric elements 34 comprise a pair of bending diaphragms 44 with a pair of ceramic discs 46 attached, e.g. glued, on both sides of each diaphragm 44. An air cavity 48 is disposed between the pairs of ceramic discs 46, and matching transformer 36 works in cooperation with the piezo-electric elements 34. If the ambient pressure increases, the pressure bends the elements 34 to compress the air in air cavity 48. The bending stress causes motion of electrons on the surface of the ceramic discs 46, and the charge of the electrons is converted to electric signals by using a step-down transformer. The capacitance of the piezo-ceramic material of the ceramic discs 46 and the inductance of the transformer 36 normally are chosen to match the natural frequency of the hydrophone 20, e.g. geophone.

Figure 5:
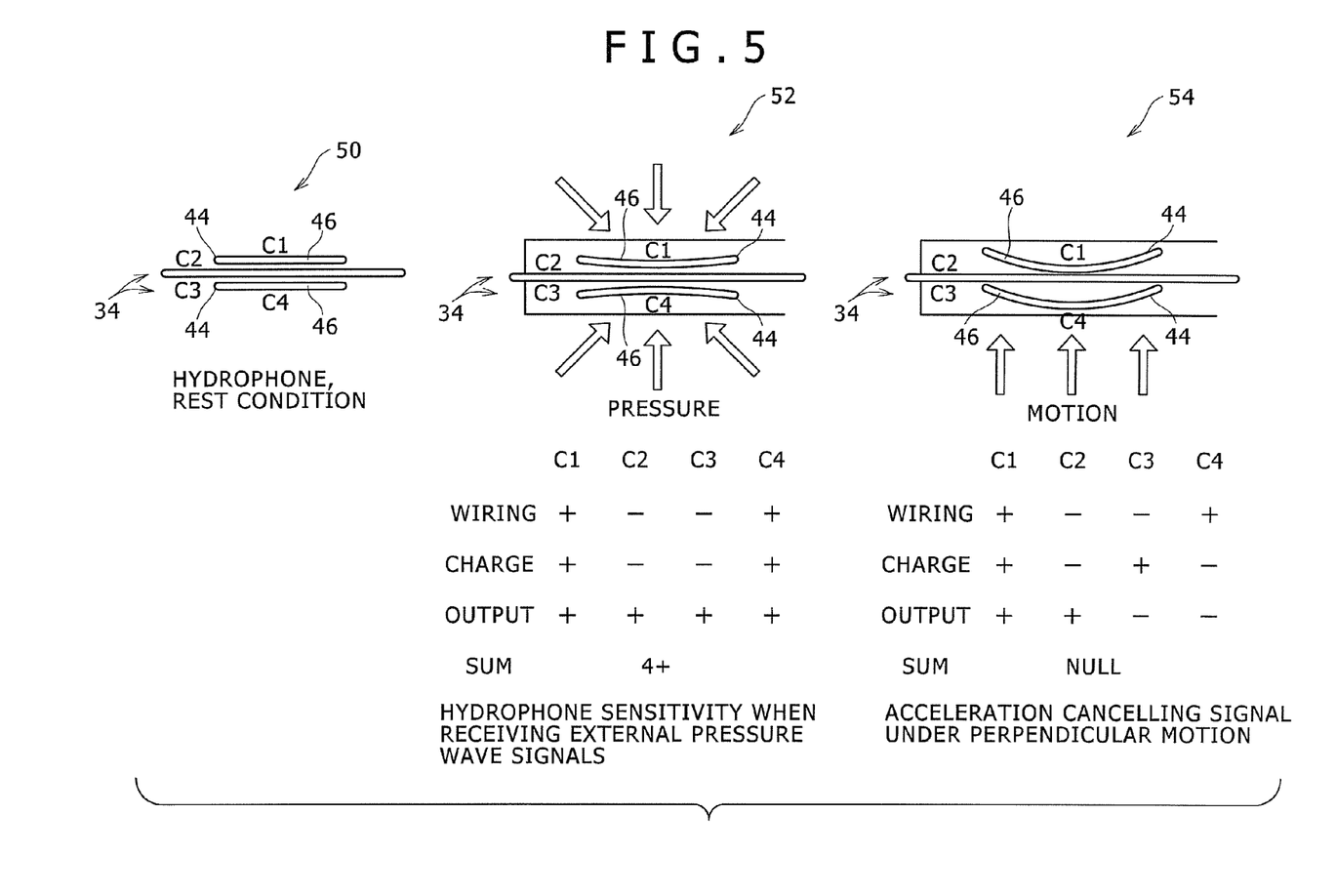
FIG. 5 is a diagram of acceleration canceling capabilities of a hydrophone.

The different ways in which external noise/acceleration and pressure affects hydrophone 20 is best illustrated in FIG. 5, which demonstrates a passive acceleration compensation technique. As illustrated, when the hydrophone 20 undergoes no pressure or motion, there is no movement of the diaphragm 44 and the overall piezo-electric elements 34 are similarly stable, as represented by section 50 of FIG. 5. Under pressure, however, the diaphragms 44 and elements 34 are deformed in opposite directions and provide an output relative to the pressure, as represented by section 52 of FIG. 5. Under motion, e.g. motion caused by movement of the hydrophone 20 (external noise/acceleration), the diaphragms 44 and elements 34 are deformed in the same direction, as represented by section 54 of FIG. 5. The deformation caused by movement can be theoretically compensated, e.g. eliminated, by appropriately wiring the hydrophone, thus resulting in a null or non-output. In other words, the acceleration of the hydrophone, caused by the external movement, can be "canceled" or "compensated."

Figure 6:
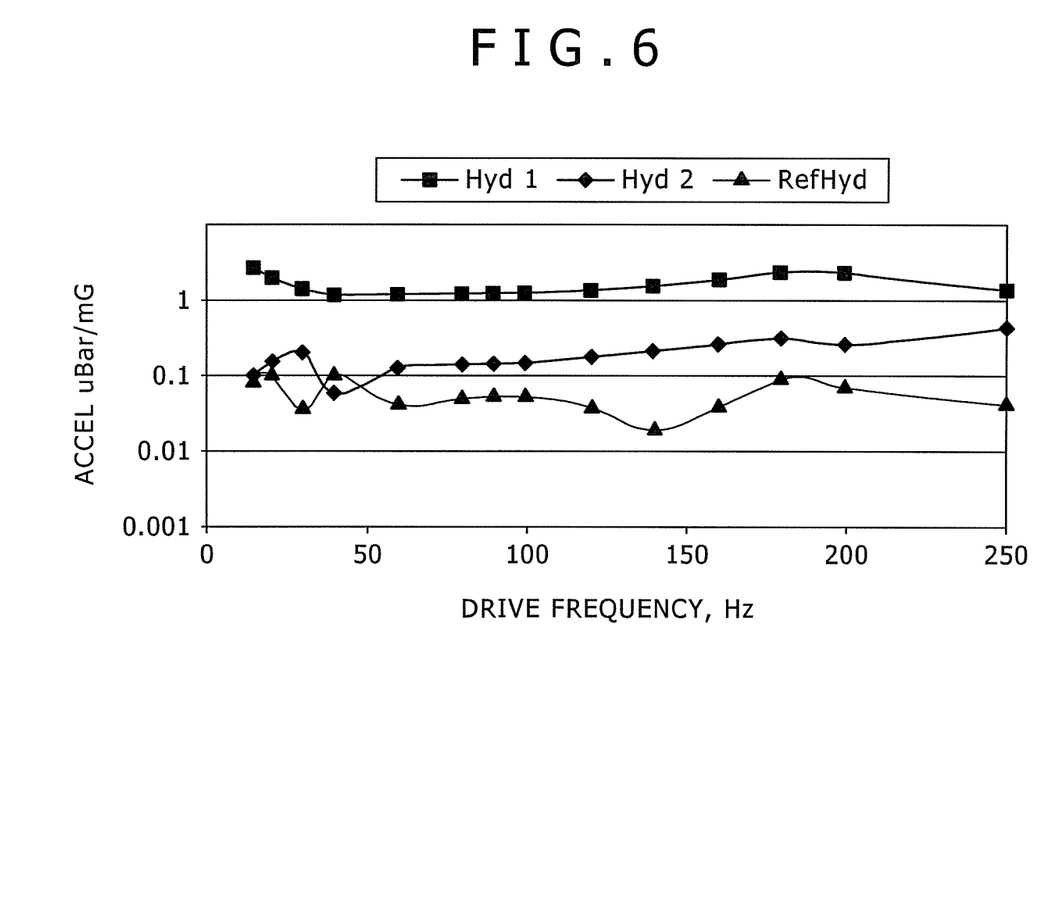
FIG. 6 illustrates a graph showing acceleration canceling values of a plurality of hydrophones tested at non-ideal atmospheric conditions.

Referring generally to FIG. 6, test results are illustrated graphically regarding measurement of acceleration compensation for two selected hydrophones 20 and a reference hydrophone at atmospheric conditions which, as discussed above, are not ideal. The test results provide measured acceleration compensation of the hydrophones graphed relative to drive frequency. Acceleration cancelling values were calculated using an output of the hydrophones being measured (Hyd 1, Hyd 2 and Ref Hyd) and an output of a reference accelerometer. If the acceleration cancelling of the hydrophone could be perfect, e.g. if the hydrophone could cancel or compensate for all external acceleration, then the resultant values would be (0) zero. However, because the acceleration cancelling is not perfect, the output of the hydrophone, without further manipulation, would simply be a relative, incomparable value.

To provide a platform of proper comparison, the theoretical true acceleration of the hydrophone can be obtained through the use of an accelerometer, thus permitting calculation of a 'true' or 'absolute' acceleration cancelling value, enabling comparison to other hydrophones. However, as described previously, this method has major drawbacks in actual implementation and results in information that is not representative of the true acceleration compensation abilities of the hydrophone. The present system and methodology enables testing of hydrophone 20 under conditions representative of the actual conditions in which the hydrophone 20 is to be operated. Consequently, the true performance of these canceling or compensating features of the hydrophone, whether passive or active, can be readily measured.

Figure 7:
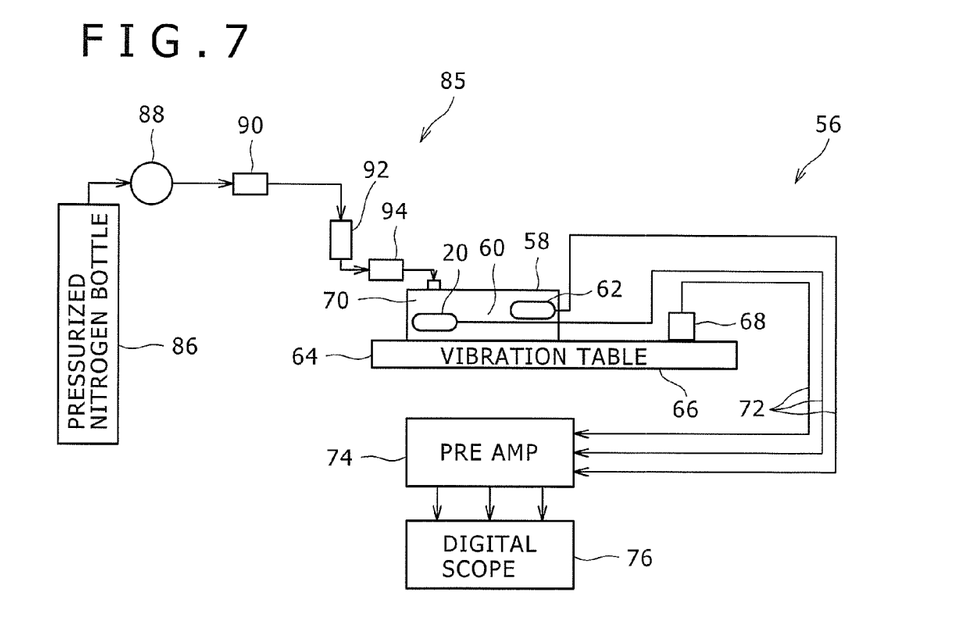
FIG. 7 schematically illustrates an example of a system for measuring acceleration compensation of a hydrophone, according to an embodiment of the present invention.
Figure 8:
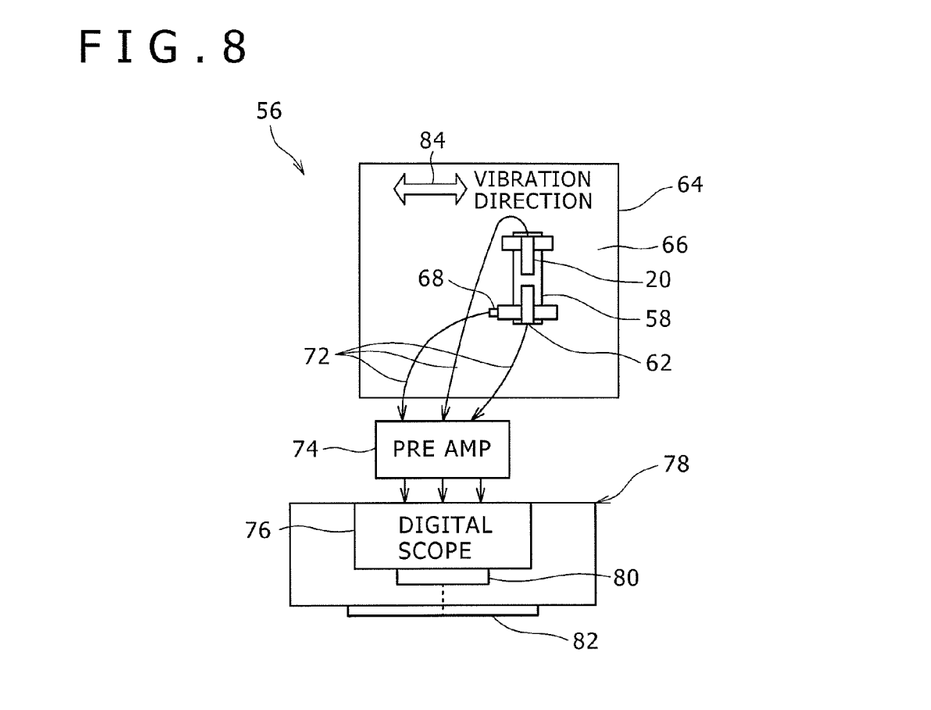
FIG. 8 is another schematic illustration of the system illustrated in FIG. 7, according to an embodiment of the present invention.

Referring generally to FIGS. 7 and 8, an example of a testing apparatus 56 and corresponding method is illustrated. In this embodiment, the testing apparatus 56 comprises a pressure vessel 58 having an interior pressure chamber 60. The pressure vessel 58 and its interior chamber 60 are appropriately sized to contain, e.g. enclose, one or more hydrophones 20. In the example illustrated, a test hydrophone 20 is positioned within pressure vessel 58 along with a reference hydrophone 62. The pressure vessel 58, hydrophone 20, and reference hydrophone 62 are connected to a vibratory source 64, such as a vibration table 66. By way of example, the pressure vessel 58 may be mounted on top of vibratory source 64, and hydrophone 20 and reference hydrophone 62 may be secured within pressure chamber 60. A reference accelerometer 68 also may be mounted on vibratory source 64 at, for example, a position external to pressure vessel 58 to help provide a baseline for determining an absolute acceleration canceling value of hydrophone 20.

The pressure chamber 60 of pressure vessel 58 is filled with a fluid 70 which may be pressurized to a desired pressure to establish conditions representative of the actual conditions in which the hydrophone 20 is to be operated. The fluid 70 may comprise a gas, such as air or nitrogen, but the fluid also may comprise a liquid, such as water or another suitable liquid able to replicate or at least approximate actual conditions in which the hydrophone 20 is to be operated. In many applications, the use of a liquid, e.g. water, is more useful in measuring the acceleration compensation of a given hydrophone or hydrophones 20 because of the similarity to the actual environment in which the hydrophone 20 is employed. The density of water, for example, is approximately 1000 kg/m$^3$ whereas the density of air is only approximately 1.2 kg/m$^3$. Hydrophones 20 typically are designed for use underwater for recording or listening to underwater sound and thus testing the hydrophone 20 in liquid within pressure vessel 58 can provide better measurements of hydrophone acceleration compensation.

The data output from hydrophone 20, reference hydrophone 62, and reference accelerometer 68 may be output via output lines 72 for analysis and/or display. According to one embodiment, the data is output to a pre-amplifier 74 which then outputs the appropriately amplified data for processing and display on a digital scope 76 or other suitable device. As illustrated in FIG. 8, the data may be provided to a processor-based control system 78 which is communicatively coupled to the hydrophone 20 to measure a parameter of the hydrophone 20 while the vibratory source 64 is moving the pressure vessel 58. The processor-based control system 78 comprises a processor 80 which may be programmed to process and analyze a variety of data/parameters received from hydrophone 20, reference hydrophone 62, and/or reference accelerometer 68 according to suitable algorithms or models for determining acceleration compensation and/or other hydrophone parameters.

In one test procedure, the processor 80 is communicatively coupled to the hydrophone 20 to collect acceleration canceling measurement data of the hydrophone 20 while the vibratory source 64 is activated and the pressure vessel 58 is pressurized. The data from hydrophone 20, reference hydrophone 62, and reference accelerometer 68 is readily analyzed via processor 80 to determine desired parameters, such as the absolute acceleration canceling value of the hydrophone 20. The processed results may be output to an appropriate display 82 in the form of graphs, tables, or other suitable indicia. In the specific example illustrated, digital scope 76 is part of (or works in cooperation with) the processor-based control system 78. Additionally, the processor-based control system 78 may be coupled with hydrophone 20, as well as reference hydrophone 62 and reference accelerometer 68, in the form of a closed loop control.

The vibratory source 64 is connected to hydrophone 20 via a pressure vessel 58 in a manner designed to simulate external accelerations that the hydrophone 20 would undergo in working conditions. According to one example, the hydrophone 20 is vibrated by mounting the pressure vessel 58 fixedly on vibrating table 66 and fixedly mounting the hydrophone 20 inside the pressure vessel 58. If a reference hydrophone is used, the reference hydrophone also may be fixedly mounted inside the pressure vessel 58. In the particular example illustrated, pressure vessel 58 is mounted to vibration table 66 so that the vibration motion direction, as represented by arrow 84, is perpendicular to the mount direction of hydrophone 20 and reference hydrophone 62, as best illustrated in FIG. 8. As a consequence of the pressure vessel, hydrophone arrangement, and processor-based control system, a more representative measurement of the true acceleration compensation abilities of hydrophone 20 may be obtained.

In the example illustrated, pressure is applied to pressure chamber 60 by a pressure system 85 having a pressurized fluid source 86, such as a pressurized nitrogen source. The pressurized nitrogen may be routed directly into pressure chamber 60 to surround hydrophone 20 and any reference hydrophones 62. Alternatively, the pressurized nitrogen may be used to pressurize a separate fluid, e.g. a liquid contained in pressure chamber 60, through an appropriate interface mechanism. In the example illustrated, pressurized fluid, e.g. nitrogen, is delivered from pressurized fluid source 86 through a regulator 88 and to a control valve 90. In this example, the high-pressure fluid passes through control valve 90, through a pressure gauge 92, and through a second control valve 94 before being delivered to pressure vessel 58. Of course, a variety of valves, regulators, high-pressure lines, and other components may be utilized to pressurize the gas or liquid within pressure vessel 58.

Figure 9:
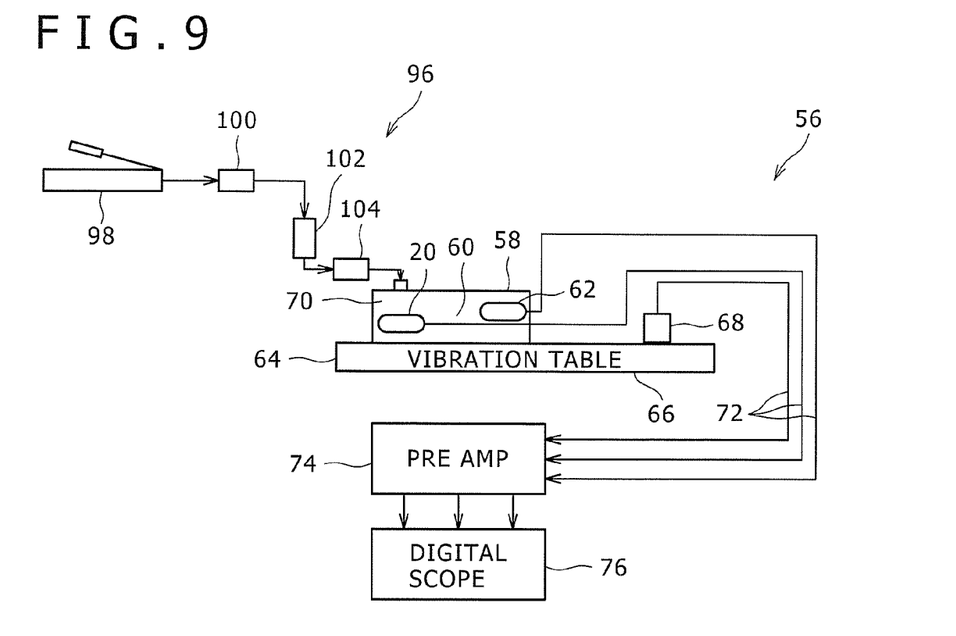
FIG. 9 schematically illustrates another example of a system for measuring acceleration compensation of a hydrophone, according to an embodiment of the present invention.
Figure 10:
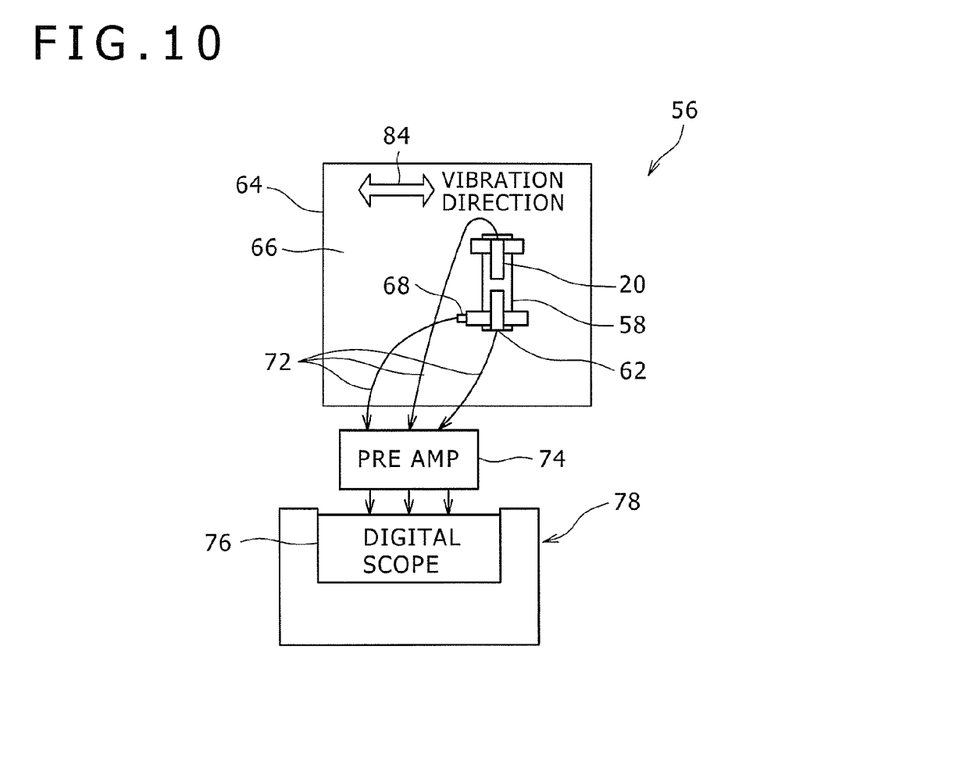
FIG. 10 is another schematic illustration of the system illustrated in FIG. 9, according to an embodiment of the present invention.

An alternate embodiment of testing apparatus 56 is illustrated in FIGS. 9 and 10. Components which are the same or similar to those illustrated and described with reference to FIGS. 7 and 8 are labeled with the same reference numerals for convenience. In the embodiment of FIGS. 9 and 10, fluid 70 is a liquid which is pressurized to a desired level by a pressure system 96. By way of example, fluid 70 is water although other types of liquids may be used within pressure vessel 58. In this embodiment, the liquid 70 completely fills pressure chamber 60; and the one or more hydrophones 20 along with any reference hydrophones 62 are submerged in the liquid 70.

Pressure system 96 comprises a pressure source 98, such as a pressure pump, used to deliver a pressurized fluid, e.g. hydraulic fluid, to pressure vessel 58 for increasing the pressure of liquid 70 to a desired level within pressure chamber 60. In the specific example illustrated, pressure source 98 is coupled to pressure vessel 58 via a first control valve 100, a pressure gauge 102, and a second control valve 104. However, a variety of pressure sources, valves, regulators, high-pressure lines, and other components may be utilized to pressurize the liquid 70 within pressure vessel 58.

Figure 11:
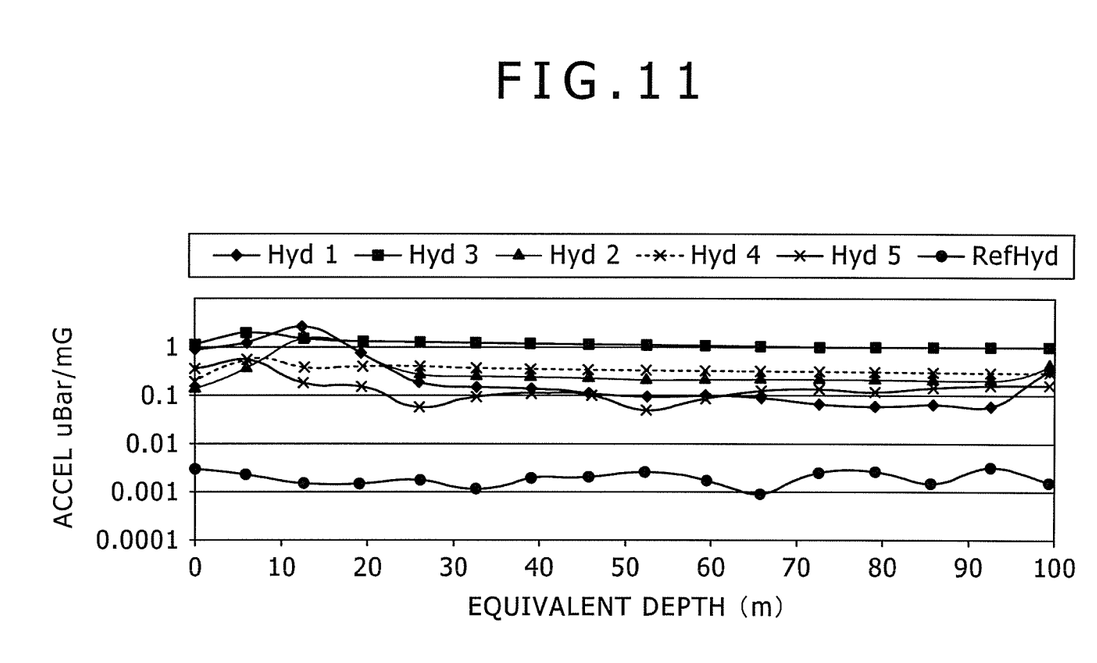
FIG. 11 illustrates a table showing acceleration canceling values of a plurality of hydrophones at a drive frequency of 20 Hz.
Figure 12:
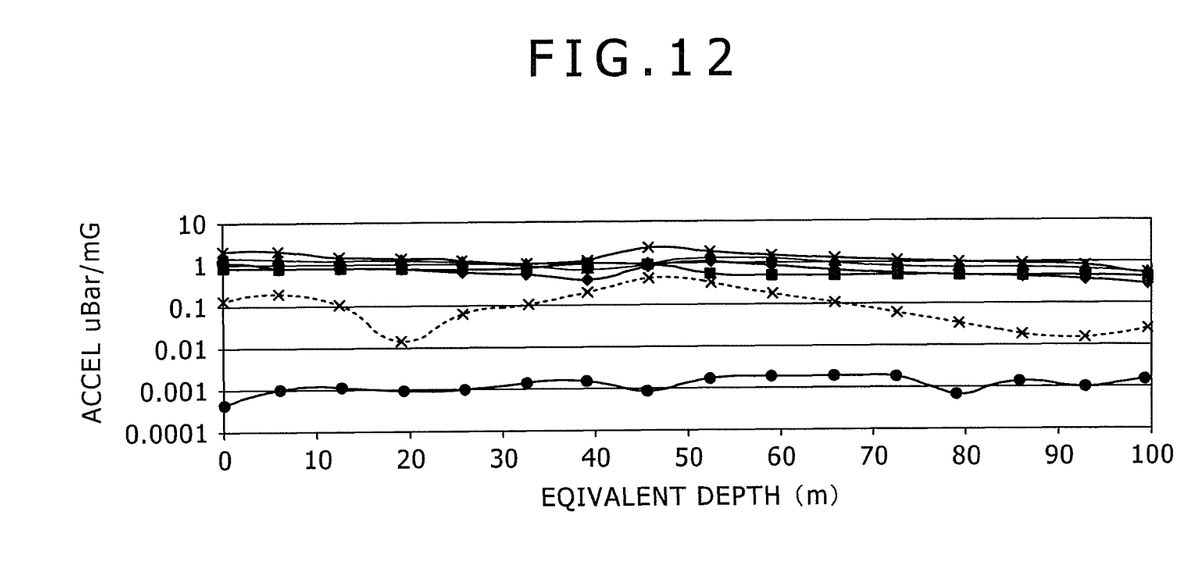
FIG. 12 illustrates a table showing acceleration canceling values of a plurality of hydrophones at a drive frequency of 80 Hz.

The testing apparatus 56 illustrated in FIGS. 9 and 10 may employ fluid 70 in the form of water to enable effective determination of the acceleration compensation of the hydrophone 20. As previously described, the acceleration cancelling values may be calculated using an output of the test hydrophone 20 and an output of the reference accelerometer 68 to obtain a 'true' or 'absolute' acceleration cancelling value of the hydrophones 20. As illustrated graphically in FIGS. 11 and 12, the acceleration compensation values of hydrophones can vary greatly. FIG. 11 illustrates examples of acceleration response of a variety of hydrophones 20 verses hydrostatic pressure at a drive frequency of 20 Hz, and FIG. 12 illustrates similar examples at a drive frequency of 80 Hz. Even though the acceleration response can vary substantially at different depths and between different types of hydrophones, the present apparatus and methodology provide an accurate and repeatable technique for measuring the acceleration compensation or other parameters of the hydrophones. It should be noted that each additional depth of 10 meters referenced in the graphs of FIGS. 11 and 12 corresponds to approximately one additional bar of hydrostatic pressure.

Along with the benefits noted above, the testing apparatus 56 is very portable and may be manufactured using ordinary, readily-available or easy to order lab equipment. In other words, the testing apparatus 56 is readily built, used, and maintained in a typical lab environment with negligible or no associated risk.

Figure 13:
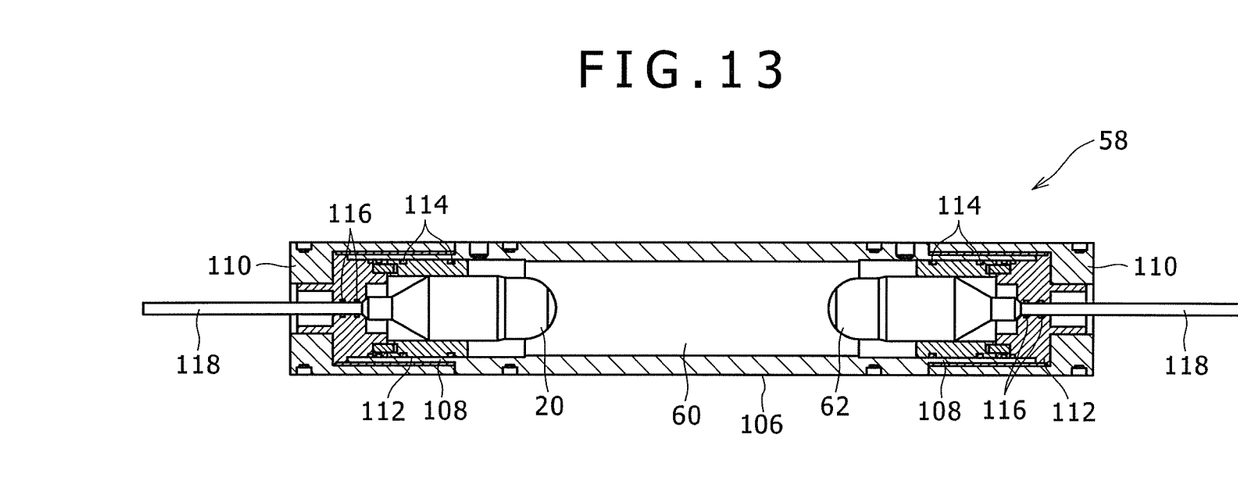
FIG. 13 illustrates a cross-sectional view of one example of a pressure chamber for measuring acceleration compensation values of hydrophones, according to an embodiment of the present invention.

Testing apparatus 56 may incorporate a variety of pressure vessels 58 depending on the number of hydrophones 20 to be tested and on the conditions to be created within the pressure vessel 58. In FIG. 13, an example of one type of pressure vessel 58 is illustrated. In this embodiment, pressure chamber 60 is large enough to contain a plurality of hydrophones 20, 62, e.g. two hydrophones. The pressure vessel 58 is formed with a pressure housing 106 having end connectors 108 designed for engagement with corresponding end caps 110. By way of example, end connectors 108 may be threaded for engagement with corresponding threads on end caps 110.

In this embodiment, pressure vessel 58 also may comprise mounting structures 112 arranged such that an individual mounting structure 112 is disposed within a corresponding end connector 108 and end cap 110. Each mounting structure 112 comprises one or more seals 114 to form a sealed engagement with the pressure housing 106. Additionally, each mounting structure 112 may comprise one or more seals 116 positioned to seal about a communication line or feature 118 through which data from each hydrophone 20, 62 is relayed to output lines 72 and on to processor-based system 78 (e.g., see FIGS. 7-10). The illustrated pressure vessel 58, however, is simply an example of one type of pressure vessel and should not be construed as limiting. Pressure vessels 58 may be designed in a variety of configurations and sizes with a variety of features to accommodate testing of desired hydrophones 20 for use in many types of seismic survey applications, including borehole seismic surveys on an offshore rig, towed array surveys, and other types of seismic surveys.

As discussed above, the testing apparatus and methodology may be employed to measure one or more parameters of a hydrophone under pressurized and/or other conditions representative of the conditions in which the hydrophone is to be employed. In many types of survey applications, measurement of acceleration compensation of hydrophones is desirable to facilitate accurate collection and use of seismic data obtained from seismic surveys. The testing apparatus and methodology may be employed with many types of hydrophones for use in many types of seismic surveys.

Additionally, the specific components and arrangements of components in the testing apparatus may vary from one testing application to another. In some embodiments, the testing apparatus 56 is designed as a portable apparatus which allows the apparatus to be readily loaded on a vehicle for movement from one testing location to another. Additionally, various components of the testing apparatus may be constructed as modular components to facilitate replacement and/or interchanging with other types of components. The pressure vessel also may be designed to accommodate different types of hydrophones and different numbers of hydrophones, as desired for a specific testing application.

Accordingly, although only a few embodiments of the present disclosure have been described in detail above, those of ordinary skill in the art will readily appreciate that many modifications are possible without materially departing from the teachings of this disclosure. Such modifications are intended to be included within the scope of this invention as defined in the claims.

What is claimed is:

1. An apparatus for measuring a hydrophone's acceleration canceling properties comprising:
    a vibratory source;
    a pressure vessel connected to the vibratory source, the pressure vessel containing a fluid medium;
    a hydrophone mounted within the pressure vessel; and
    a processor communicatively coupled to the hydrophone and configured to collect acceleration canceling measurement data of the hydrophone while the vibratory source is activated and the pressure vessel is under pressure.

2. The apparatus of claim 1, wherein the fluid medium is a hydraulic fluid medium.

3. The apparatus of claim 2, wherein the hydraulic fluid medium comprises water.

4. The apparatus of claim 2, wherein the pressure vessel is completely filled with the hydraulic fluid medium.

5. The apparatus of claim 1, further comprising a reference hydrophone communicatively coupled with the processor.

6. The apparatus of claim 5, wherein the vibratory source comprises a vibratory table.

7. The apparatus of claim 5, further comprising a reference accelerometer mounted on the vibratory source outside of the pressure vessel.

8. The apparatus of claim 7, wherein the reference accelerometer is to provide a baseline for determining an absolute acceleration canceling value for the hydrophone.

9. The apparatus of claim 1, wherein the pressure vessel is mounted so the direction of vibration is perpendicular to a mount direction of the hydrophone.

10. The apparatus of claim 1, wherein the pressure vessel moves with the vibratory source when the source vibrates.

11. A method for measuring at least one parameter of a hydrophone comprising:
    activating a vibratory source;
    pressurizing a fluid-filled vessel containing a hydrophone;
    measuring a parameter of the hydrophone while the vibratory source is moving the pressure vessel;
    measuring an acceleration of the vibratory source with an accelerometer; and
    calculating the hydrophone's absolute acceleration by utilizing the accelerometer measurement and the hydrophone parameter measurement.

12. The method of claim 11, wherein measuring a parameter includes measuring hydrophone acceleration canceling properties.

13. The method of claim 11, wherein activating comprises activating a vibratory table supporting the pressure vessel.

14. The method of claim 11, further comprising placing a reference hydrophone in the fluid-filled vessel.

15. The method of claim 11, wherein pressurizing comprises pressurizing a liquid in the fluid-filled vessel.

16. A method, comprising:
    selecting a hydrophone for evaluation;
    placing the hydrophone in a pressure vessel and vibrating the hydrophone;
    determining, using a processor based system, an absolute acceleration canceling value of the hydrophone; and
    providing, using a processor based system, an indicia of the absolute acceleration canceling value.

17. The method of claim 16, wherein determining an absolute acceleration canceling value of the hydrophone comprises using a reference accelerometer measuring a baseline acceleration.

18. The method as recited in claim 16, wherein determining comprises utilizing a processor based system to collect and process acceleration canceling measurement data of the hydrophone while vibrating the hydrophone.

19. The method as recited in claim 18, wherein determining comprises pressurizing a liquid in the pressure vessel while the hydrophone is submerged in the liquid.

20. The method as recited in claim 19, wherein determining further comprises processing accelerometer data obtained from an accelerometer vibrated with the hydrophone.

* * * * *